US 8,041,806 B2

(12) United States Patent
Gassewitz et al.

(10) Patent No.: US 8,041,806 B2
(45) Date of Patent: Oct. 18, 2011

(54) TARGETED ELECTRONIC CONTENT DELIVERY CONTROL SYSTEMS AND METHODS

(75) Inventors: Michael Peter Gassewitz, Ottawa (CA); Denny Lee, Kanata (CA); Steven Edward Morin, Ottawa (CA)

(73) Assignee: Alcatel Lucent, Paris (FR)

( * ) Notice: Subject to any disclaimer, the term of this patent is extended or adjusted under 35 U.S.C. 154(b) by 1221 days.

(21) Appl. No.: 11/530,519

(22) Filed: Sep. 11, 2006

(65) Prior Publication Data

US 2008/0065759 A1    Mar. 13, 2008

(51) Int. Cl.
*G06F 15/16* (2006.01)
(52) U.S. Cl. ...................................................... 709/224
(58) Field of Classification Search .................. 709/224, 709/223
See application file for complete search history.

(56) References Cited

U.S. PATENT DOCUMENTS

| | | | | |
|---|---|---|---|---|
| 5,974,451 A * | 10/1999 | Simmons | ...................... | 709/218 |
| 7,337,127 B1 * | 2/2008 | Smith et al. | ...................... | 705/14 |
| 2002/0010584 A1 * | 1/2002 | Schultz et al. | ................ | 704/270 |
| 2002/0099854 A1 * | 7/2002 | Jorgensen | ...................... | 709/249 |
| 2002/0105911 A1 * | 8/2002 | Pruthi et al. | ................... | 370/241 |
| 2003/0207685 A1 * | 11/2003 | Rankin | .......................... | 455/433 |
| 2005/0018697 A1 * | 1/2005 | Enns et al. | ...................... | 370/401 |
| 2006/0021353 A1 | 2/2006 | Lawlor et al. | | |
| 2006/0123001 A1 * | 6/2006 | Burns | ................................ | 707/6 |
| 2006/0212353 A1 * | 9/2006 | Roslov et al. | ................... | 705/14 |
| 2007/0022442 A1 * | 1/2007 | Gil et al. | .......................... | 725/62 |
| 2008/0140525 A1 * | 6/2008 | Lamsfuss et al. | ............... | 705/14 |

FOREIGN PATENT DOCUMENTS

| | | |
|---|---|---|
| EP | 0 837 583 A2 | 4/1998 |
| WO | WO 01/20481 A2 | 3/2001 |
| WO | WO 02/17202 A2 | 2/2002 |
| WO | WO 2006/034844 A1 | 4/2006 |

* cited by examiner

*Primary Examiner* — Wing Chan
*Assistant Examiner* — Andrew Woo
(74) *Attorney, Agent, or Firm* — Eckert Seamans Cherin & Mellot, LLC.

(57) ABSTRACT

Targeted electronic content delivery control systems and methods are disclosed. All communication traffic exchanged with a communication network subscriber over an access communication link that enables the subscriber to access electronic content is monitored, and behavioral information indicative of behavior of the subscriber in using the access communication link is collected from the monitored communication traffic. A behavioral profile of the subscriber is maintained based on the behavioral information. Delivery of targeted electronic content to the subscriber for presentation with electronic content accessed by the subscriber is controlled based on the behavioral profile.

14 Claims, 3 Drawing Sheets

TARGETED ELECTRONIC CONTENT DELIVERY CONTROL SYSTEMS AND METHODS

FIELD OF THE INVENTION

This invention relates generally to communications and, in particular, to control of electronic content delivery to subscribers in communication networks based on subscriber behaviors.

BACKGROUND

Those familiar with existing advertising distribution techniques will appreciate the advertising spend wastage problem. Much advertising, whether online or through traditional media, is delivered to consumers without regard to their buying intent and/or personal interests. There are three main types of existing online advertisement solutions that attempt to address this problem. These include advertisement delivery with search, advertisement delivery with content, and advertisement delivery using a behavioral network.

In an advertisement delivery with search scheme, advertisements are delivered by a search engine provider along with search results. Typically, the advertisements selected for display are contextually related to a search phrase. U.S. patent application Ser. No. 11/272,026, entitled "SYSTEMS AND METHODS FOR SELECTING DIGITAL ADVERTISEMENTS" and published on Jun. 8, 2006 as Publication No. 2006/0123001, discloses another example of a search-based system, in which digital advertisements to be sent to a user's computer are chosen based on information relating to searches conducted by the user. In this example, advertisements are related to searches, but might not necessarily be returned to the user with search results. However, search context-based advertisement delivery mechanisms do not capture the ongoing buying intent and/or other personal interests of a user.

Advertisement delivery with content involves delivering advertisements with the content of a portal, in a webpage for instance. The advertisements selected for display are normally contextually related to the content of the portal. As noted above for search context, content context analysis does not capture the ongoing buying intent and/or other personal interests of the user.

For some currently available advertisement delivery mechanisms using a behavioral network, the "network" is a limited community of cooperating portals. These portals participate as members of an "ad network". As a user visits the portals, cookies and/or web beacons can be used to track and log the user and the user's behavior within the ad network. Advertisements are selected for delivery with the content of a portal according to the identity of the user and the user's tracked behavior.

An ad network implementation requires a community of cooperating portals to be established. One problem with this type of behavioral ad network lies in the limited extent of such a network, which can lead to difficulties in tracking users. When a user traverses portals that are outside the domain of an ad network, the ad network loses the ability to track the behavior of the user, thus limiting its effectiveness. Advertisers thus cannot be certain of the accuracy of behavioral assessments, since users may have visited many sites that are not within the portal community of an ad network. In addition, further tracking problems can arise when users disable cookies.

U.S. patent application Ser. No. 09/863,593, entitled "APPARATUS AND METHOD FOR COLLECTING AND ANALYZING COMMUNICATIONS DATA" and published on Aug. 8, 2002 as Publication No. 2002/0105911, proposes a system in which packets are extracted from data received from a first communication line and statistics corresponding to the packets are then recursively generated. Although this patent application concentrates primarily on communication network management based on these statistics, reference is made to profiling data about users or their traffic on such networks. A network monitor might filter each received packet based on its contents, such as by looking for specific text within packets or for web sites visited by a user. The level of user behavioral analysis in this patent application appears to be limited, since packet content filtering techniques are not disclosed in detail. Content delivery also appears to be independent of current in-process user access activities, as is evident from the disclosed example of targeted email as a content delivery mechanism.

U.S. patent application Ser. No. 09/833,444, entitled "USER PROFILING COMMUNICATIONS SYSTEM" and published on Nov. 6, 2003 as Publication No. 2003/0207685, also discloses user profiling for a system in which a user has multiple terminals. The terminals cooperate to transfer automatically gathered user profile information, which includes service access information for accessing services. The user profiles are used for a different purpose in this published patent application, for service access rather than advertisement or other content delivery.

Thus, there remains a need for improved targeted electronic content delivery control techniques.

SUMMARY OF THE INVENTION

Embodiments of the present invention may significantly improve an advertiser's return on investment of its advertising expenditures by delivering highly relevant targeted online advertisements and/or other electronic content to end consumers using continuous and thorough analysis of the consumers' online behaviors.

In accordance with an aspect of the invention, there is provided a system that includes a behavioral information collector operable to monitor all communication traffic exchanged with a communication network subscriber over an access communication link, the access communication link enabling the subscriber to access electronic content, and to collect from the monitored communication traffic behavioral information indicative of behavior of the subscriber in using the access communication link, a behavioral analyzer operatively coupled to the collector and operable to maintain a behavioral profile of the subscriber based on the behavioral information, and an electronic content delivery controller operatively coupled to the behavioral analyzer and operable to control, based on the behavioral profile, delivery of targeted electronic content to the subscriber for presentation with electronic content accessed by the subscriber.

The behavioral information collector may be operable to collect the behavioral information from only one or more particular types of the monitored communication traffic.

In some embodiments, the behavioral analyzer is operable to maintain the subscriber behavioral profile based on behavioral information collected from only one or more particular types of the monitored communication traffic.

Where the monitored communication traffic includes packet traffic, the system may also include a Deep Packet Inspection (DPI) module operatively coupled to the behavioral information collector and operable to monitor the access communication traffic.

The behavioral information collector is in an offline position relative to the access communication link in some embodiments.

The system may also include a memory operatively coupled to the behavioral analyzer for storing behavioral analysis definitions, in which case the behavioral analyzer maintains the subscriber behavior profile in accordance with the stored behavioral analysis definitions.

An electronic content source may be operatively coupled to the electronic content delivery controller and operable to deliver the accessed electronic content to the subscriber. The electronic content delivery controller may then be operable to control delivery of targeted electronic content to the subscriber by providing the targeted electronic content to the electronic content source for delivery to the subscriber with the accessed electronic content.

Where the access communication link is a network link in an access network, the access network may include an electronic content source that is operable to deliver the accessed electronic content to the subscriber.

The electronic content source may provide an Internet Protocol Television (IPTV) service, for example.

In some embodiments, the electronic content delivery controller is further operable to select the targeted electronic content from targeted electronic content provided by multiple targeted electronic content providers.

The targeted electronic content may include an advertisement.

At least one of the behavioral information collector, the behavioral analyzer, and the electronic content delivery controller may be implemented in software for execution by one or more processing elements.

Such a system may be implemented, for example, in a set of one or more network elements for providing to a subscriber system access to electronic content through an access communication network.

A method is also provided, and includes monitoring all communication traffic exchanged with a communication network subscriber over an access communication link, the access communication link enabling the subscriber to access electronic content, collecting from the monitored communication traffic behavioral information indicative of behavior of the subscriber in using the access communication link, maintaining a behavioral profile of the subscriber based on the behavioral information, and controlling, based on the behavioral profile, delivery of targeted electronic content to the subscriber for presentation with electronic content accessed by the subscriber.

Collecting may involve collecting the behavioral information from only one or more particular types of the monitored communication traffic.

The operation of maintaining may involve maintaining the subscriber behavioral profile based on behavioral information collected from only one or more particular types of the monitored communication traffic.

Where the access communication link is a network link in an access network, the access network may include an electronic content source that is operable to deliver the accessed electronic content to the subscriber.

The method may also include selecting the targeted electronic content from targeted electronic content provided by multiple targeted electronic content providers.

The targeted electronic content may include an advertisement.

A method may be embodied, for example, in instructions stored on a machine-readable medium.

A machine-readable medium storing a data structure is also provided. The data structure includes information identifying a communication network subscriber, and a behavioral profile maintained for the identified subscriber based on behavioral information, which is collected from all communication traffic exchanged with the subscriber over an access communication link that enables the subscriber to access electronic content and is indicative of behavior of the subscriber in using the access communication link. The behavioral profile allows selection of targeted electronic content to be delivered to the subscriber for presentation with electronic content accessed by the subscriber.

According to another aspect of the invention, a machine-readable medium stores a data structure that includes information specifying targeted electronic content, and information specifying a behavior associated with the specified targeted electronic content. The information that specifies a behavior allows selection of the specified targeted electronic content to be delivered to a communication network subscriber, by whom the specified behavior is exhibited in using an access communication link that enables the subscriber to access electronic content, for presentation with electronic content accessed by the subscriber.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMDOBIMENTS

Figure 1:
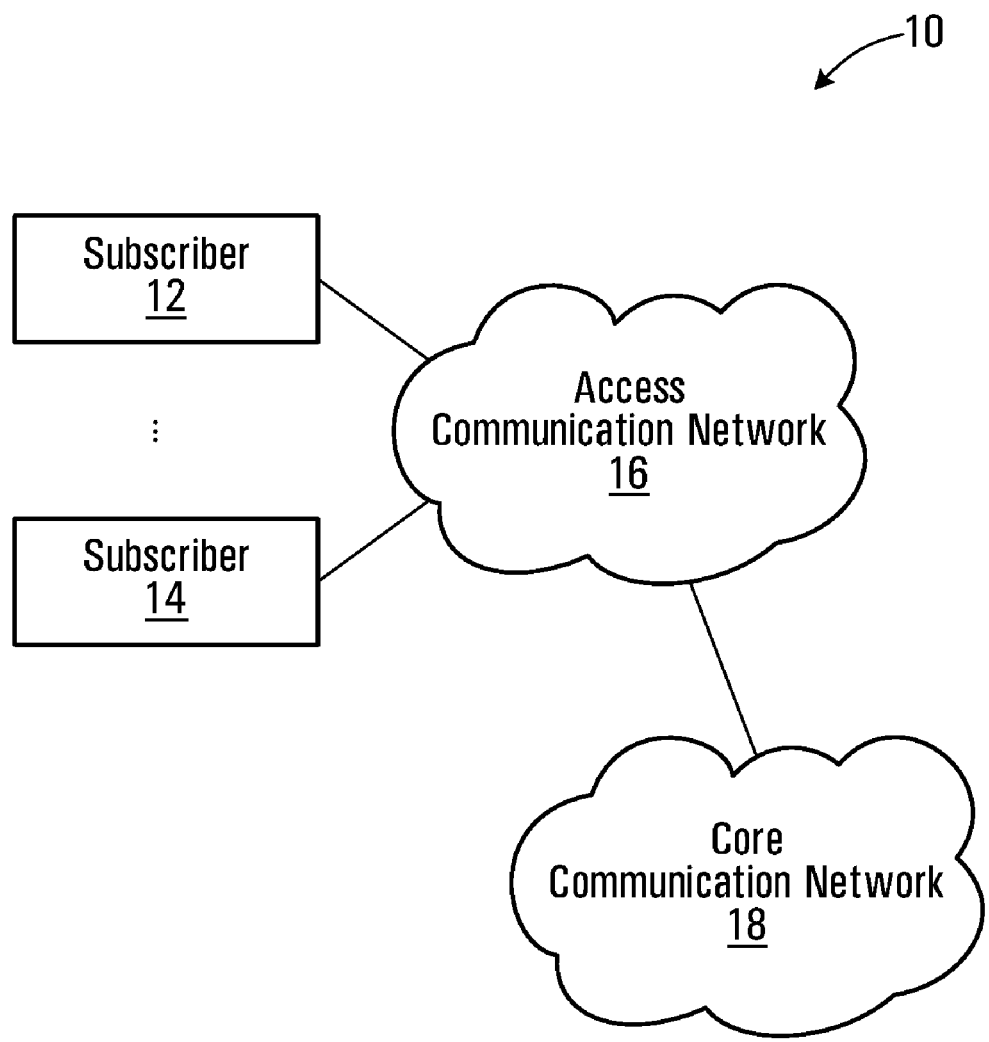
FIG. 1 is a block diagram of a communication system.

FIG. 1 is a block diagram of a communication system in which embodiments of the invention may be implemented. The communication system 10 in FIG. 1 includes subscriber systems 12, 14, an access communication network 16, and a core communication network 18. Although many subscriber systems 12, 14 and access networks 16 may be connected to a core communication network 18, only two subscriber systems and one access network have been shown in FIG. 1 to avoid overly complicating the drawing. Internal details of the subscriber systems 12, 14 and the networks 16, 18 have not been explicitly shown in FIG. 1 for similar reasons. It should therefore be appreciated that the system of FIG. 1, as well as the contents of the other drawings, are intended solely for illustrative purposes, and that the present invention is in no way limited to the particular example embodiments shown in the drawings and described herein.

Those skilled in the art to which the present invention pertains will be familiar with many different types of subscriber systems 12, 14, access communication networks 16, and core communication networks 18. The present invention is not limited to any particular type of subscriber or network equipment.

In one embodiment, each subscriber system 12, 14 is, or at least includes, a communication device through which a subscriber can exchange communication traffic with the access communication network 16, and thus access electronic content, services, and/or other functions supported in the access communication network or in the core communication network 18. A personal computer with a modem is one example of a subscriber system, although other types of subscriber systems, including fixed, portable, or mobile devices are also contemplated.

The topology shown in FIG. 1 is typical of an Internet service system, wherein an Internet Service Provider (ISP) implements switches, routers, and/or other network equipment as the access communication network 16 to provide its subscribers with access to the Internet as the core communication network 18.

Electronic content, searching, shopping, and/or other functions may be supported by servers or other systems within the access communication network 16, where an ISP provides an Internet Protocol TV (IPTV) service as a source of electronic content for instance, by servers or other systems within or connected to the core communication network 18, or in both the access and core communication networks.

As noted above, many examples of subscriber, access network, and core network technologies and their operation will be familiar to those skilled in the art. Since the present invention is not limited to any particular types of equipment, protocols, or operation, subscriber and network equipment are described only to the extent necessary to illustrate embodiments of the invention. In one embodiment, the techniques disclosed herein are implemented in an access network such as 16. This type of implementation is described in further detail below with reference to FIG. 2, which is a block diagram of a communication system that incorporates behavior-based electronic content delivery control.

Figure 2:
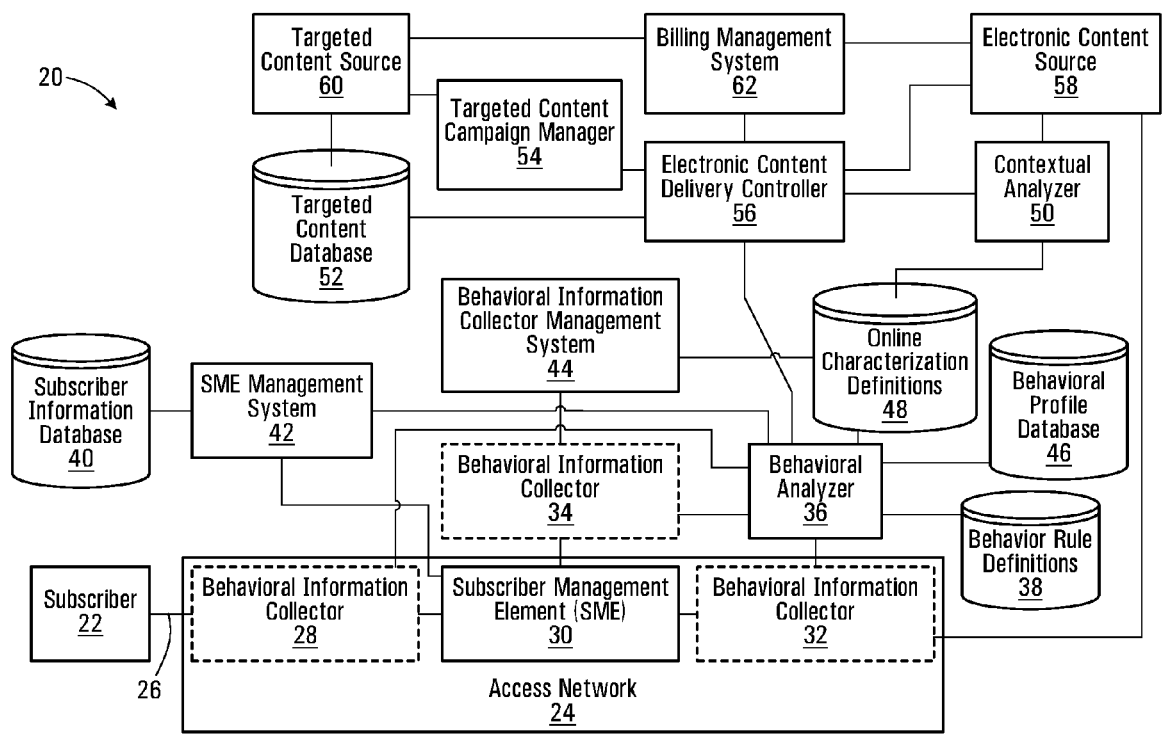
FIG. 2 is a block diagram of a communication system incorporating behavior-based electronic content delivery control.

The system 20 of FIG. 2 includes a subscriber system 22, which is operatively coupled to an access network 24 through an access communication link 26. The access network 24 is operatively coupled to an electronic content source 58, which is one example of a system that provides a function or service, in this case electronic content, to the subscriber 22. A subscriber management element (SME) 30 is provided within the access network 24, and is operatively coupled to the access communication link 26. A behavioral information collector may be deployed "inline" in the access communication link 26 at the access side or network side of the SME 30, as shown at 28 and 32, respectively.

A behavioral information collector 34 may also or instead be provided in an "offline" position, operatively coupled to the access communication link 26 but not itself part of that link. In the example shown, the offline behavioral information collector 34 is operatively coupled to the SME 30, although other connection schemes are also possible. A behavioral information collector management system 44 is operatively coupled to the or each behavioral information collector 28, 32, 34, and to the online characterization definitions database 48. Operative couplings between the behavioral information collector management system 44 and the behavioral information collector(s) 28, 32 have not been shown in order to avoid overly complicating the drawing.

An SME management system 42 is operatively coupled to the SME 30 and to a subscriber information database 40.

A behavioral analyzer 36 is operatively coupled to the or each behavioral information collector 28, 32, 34, to the SME management system 42, to an electronic content delivery controller 56, and to databases 38, 46, 48. A contextual analyzer 50 is operatively coupled to the online characterization definitions database 48, to the electronic content delivery controller 56, and to the electronic content source 58.

The electronic content delivery controller 56 is further operatively coupled to the electronic content source 58, to a billing management system 62 that is operatively coupled to one or more targeted electronic content source(s) 60 and to the electronic content source, to a targeted content campaign manager 54 that is also operatively coupled to the targeted electronic content source(s), and to a targeted electronic content database 52 that is maintained by the targeted electronic content source(s).

It should be appreciated that the system 20 represents one illustrative example of an embodiment of the invention. Other embodiments may include fewer, further, or different components, with similar or different interconnections, than shown.

The components of the system 20 and the interconnections between those components may be implemented in any of various ways. For example, each component may be implemented in hardware, software, firmware, or combinations thereof. Connections between components may include local connections such as physical cables or conductors and/or logical couplings through commonly accessed variables or memory areas where components are implemented in the same equipment, such as on one computer or network device. Longer range connections such as wired or wireless network connections may be used to couple remote components together for operation.

In one embodiment, the SME 30 is implemented in a Remote Access Server (RAS), a Broadband RAS (BRAS), or a set of routers and/or switches with subscriber management functions that acts as a distributed BRAS. A behavioral information collector might be a standalone network element that is placed in an inline position 28, 32 with the SME 30 in an access communication link 26 or in an adjunct position 34, as shown, or integrated as part of the SME 30. The collection function of the behavioral information collector, described in further detail below, could be implemented as an extended Deep Packet Inspection (DPI) platform. A DPI module used in behavioral information collection could be provided specifically for this purpose, or might be an existing module that is also used for such functions as traffic management. In one embodiment, a behavioral information collector includes some form of DPI technology. A DPI module may allow information contained in any one or more of Layers 3 to 7 of the Open Systems Interconnection (OSI) Reference Model to be examined and analyzed, for example.

The SME management system 42 and the behavior information collector management system 44 could be implemented as management software for execution by one or more processing elements, illustratively on the same or different servers. The overall infrastructure that handles and manages electronic content delivery in the system 20, including the components 36, 50, 54, 56, 58, 60, 62, could similarly be implemented as software for execution on one or more servers.

Depending on the scale of a deployment, the functions supported by the components of FIG. 2, as described in detail below, could be distributed across multiple processing elements, such as a set of servers. Different divisions of function than the example shown in FIG. 2 are also contemplated, such that any single component could itself be distributed across multiple servers. Any server or other processing element could also or instead perform the functions of several components. One server might support both the targeted content campaign manager 54 and the billing management system 62, for instance. Thus, as noted above, embodiments of the invention could be implemented with further, fewer, or different components than explicitly shown.

Given the broad range of possible implementations of many of the components of the system 20, these components are described herein primarily in terms of their functions. Based on the functional descriptions, a person skilled in the art would be enabled to implement the invention in any of various ways.

The databases 38, 40, 46, 48, 52, however, would likely be implemented using one or more physical memory devices. Solid state memory devices are common in communication and processing equipment, although other types of memory devices, for use with fixed, movable, or even removable storage media, may also or instead be used. Each database may be stored in a respective different memory device, although multiple databases could be stored in a single memory device. The databases 38, 46, 48, for example, are all used by the behavioral analyzer 36, and thus could be stored in one memory device that is accessible to the behavioral analyzer.

In the system 20, several entities participate within the example operational framework. These entities include one or more subscribers, one of which is represented at 22, one or more sources of targeted electronic content, one of which is represented at 60, and an electronic content source 58. The access network 24 enables interactions between these entities.

The subscriber 22 is in some embodiments an Internet service subscriber, or more generally a subscriber to a service offered by the access network 24. Any of various physical access mechanisms could be used by the subscriber 22 and supported by the access network 24 to establish the access connection 26, including Digital Subscriber Line (DSL), Cable Modem, Dialup, or any other physical access means. A subscriber 22 is typically a household. One advantage of some embodiments of the invention is that no changes at subscriber systems are necessary. Subscriber systems do not require any modifications to support behavior tracking, additional content processing capabilities, or other functions.

The electronic content source 58, another participant in the system 20, represents any electronic content publisher such as a traditional portal (webpage), a video content provider, etc. An electronic content source could also or instead be implemented within the access network 24. An ISP might host its own IPTV service, for example. Thus, embodiments of the invention may control delivery of targeted content for presentation to a subscriber, illustratively via a display screen or other output device, with other electronic content from electronic content sources that are internal to or external from an access network.

Electronic content sources such as 58 might allocate advertisement inventory such as spaces or timeslots in their electronic content for inserting targeted electronic content, illustratively advertisements. Advertisements are one example of targeted electronic content for which delivery is controlled in accordance with an aspect of the invention.

A source of targeted electronic content is represented in FIG. 2 at 60. An advertiser, which would be one example of a provider of targeted electronic content, reaches and promotes its products to consumers, the subscriber 22 in the system 20, through online advertising.

Interactions between the subscriber 22 and the electronic content source 58 are enabled by the access communication link 26 through the access network 24. The access network 24 might provide the subscriber 22 with access to the Internet, for example. In a typical ISP scenario, all of the online traffic that is exchanged with the subscriber 22 traverses the access communication link 26. This would be the case whether an electronic content source or other system by which a subscriber-accessible function is supported is internal to or external from the access network 24.

Within the access network 24, the SME 30 provides subscriber management functions. These functions might include authentication/authorization/accounting (AAA), policy enforcement, addressing control, etc. The SME 30 is typically managed by an SME management system 42, through which subscriber information can be stored in and retrieved from the subscriber information database 40. In practice, the SME 30 could be implemented in a RAS, a BRAS, or a distributed BRAS, such as those found in advanced "triple play" access network architectures.

The main function of a behavioral information collector, whether deployed at an inline position 28, 32 or an offline position 34, is to monitor all communication traffic flows of the subscriber 22. Offline or adjunct placement of a behavioral information collector provides improved network survivability in case of a collector failure.

Behavioral information indicative of subscriber behavior in using the access communication link is collected from at least some of the monitored communication traffic. By operatively coupling a behavioral information collector to an access communication link, all subscriber traffic can be monitored. Although all subscriber traffic could potentially be used to collect behavioral information, this behavioral information need not necessarily be collected from all of the traffic.

Through the behavioral information collector management system 44, a behavioral information collector could be configured to collect behavioral information from only certain types of traffic and/or to inspect monitored traffic for specific data or particular fields. For example, a behavioral information collector could inspect all subscriber traffic to identify visited Uniform Resource Locators (URLs), search phrases and search result click-through, upstream keywords, downstream electronic content, online web usage patterns, online applications, etc. Other aspects of behavioral information collector operation may similarly be configured or otherwise managed through the behavioral information collector management system 44.

According to one embodiment, the types of behavioral information that are to be included in behavioral analysis are specified in the online characterization definitions database 48, and the behavioral information collector management system 44 accesses these definitions and configures the behavioral information collector(s) accordingly. A behavioral information collector could also or instead be operatively coupled to the online characterization definitions database 48 to directly access the definitions.

Collected behavioral information may be aggregated together as behavioral metadata and forwarded to the behavioral analyzer 36 for further analysis. Collected behavioral information may be forwarded to the behavioral analyzer 36 automatically as it is collected, at certain intervals as aggregated behavioral metadata for instance, when explicitly requested by the behavioral analyzer, or in accordance with some other collection/reporting scheme.

The behavioral analyzer 36 receives the collected behavioral information from the behavioral information collector 28, 32, 34, and formulates a view of the subscriber's behavior. A behavioral profile may be maintained in the behavioral profile database 46 by the behavioral analyzer 36. An example of a data structure that may be used to store behavioral profiles is described below with reference to FIG. 4.

If a profile for a subscriber already exists in the database 46, then the existing profile may be updated to reflect ongoing subscriber behavior, which may change over time. A subscriber might visit product information and shopping sites to obtain information regarding features and/or prices of a particular product or type of product that is being considered for purchase. Once a purchase is actually made, however, the subscriber might no longer be interested in product information and thus not subsequently access electronic content that relates to the product or product type. This change in behavior could be detected from online traffic on the access communication link 26 and reported to the behavioral analyzer 36, which may then update the subscriber's profile accordingly.

Maintaining a subscriber behavioral profile may also involve creating a profile in the database 46 for a new subscriber.

According to an embodiment of the invention, behavioral profiles are maintained in accordance with online characterization definitions 48 and behavior rule definitions 38. These definitions are collectively referenced herein as behavior analysis definitions.

Online characterization definitions may indicate, for example, the types of traffic or information that is to be used in maintaining subscriber behavioral profiles. Such definitions might include URL, webpage context categorization, email traffic, search phrase monitoring, online application signature, etc. These definitions could be applied by either the behavioral information collector 28, 32, 34 to govern information collection, or by the behavioral analyzer 36, as shown, to control the particular collected information that is included in behavioral analysis.

Behavior rule definitions specify an analysis algorithm, or the manner in which collected information is actually analyzed to generate and/or update behavior profiles. These rule definitions may thus define the categorization of behaviors. If, for example, a behavior of interest is commerce-related, one might choose to define behavioral interest based on industry segments, such as automotive, financial services, retail, sports, travel, entertainment, garment, etc.

The databases 46, 48 may be populated during initial system configuration and/or updated from time to time. The behavioral information collector management system 44 might be used to populate or update online characterization definitions in the database 48, for example. Behavior rule definitions in the database 38 could be populated or updated through another system or user interface, illustratively a user interface for configuring the behavioral analyzer 36. Other configuration options, using an overall system manager for instance, are also possible.

The online characterization definitions and the behavior rule definitions may be "global", and applied to all subscribers of an ISP, for example, or specific to particular subscribers or groups of subscribers. Thus, more than one collection/analysis scheme may be supported in some embodiments.

The behavioral analyzer 36 may also obtain subscriber information from the SME management system 42 so as to correlate collected behavioral information and associate the collected information and/or a behavioral profile with a unique subscriber. A behavioral analysis algorithm may entail analysis of both collected behavioral information and subscriber information, such as demographic information, obtained from the subscriber information database 40 through the SME management system 42 in the system 20. References herein to maintaining behavioral profiles based on collected behavioral information should be interpreted accordingly.

For the purpose of matching targeted electronic content such as advertisements to subscribers that exhibit behaviors for which such targeted electronic content might be of interest, behavioral profiles may be generally commerce-related, and reflect the current buying intent, personal interests, and/or at which particular point in a buying cycle a subscriber is currently likely to be.

Indications of subscriber profiles may be provided by the behavioral analyzer 36 to the electronic content delivery controller 56. In one embodiment, based on a subscriber's behavioral profile, subscriber behavioral tracking tags are forwarded to the electronic content delivery controller 56, by which targeted electronic content is matched to the subscriber's behavior. It should be appreciated, however, that the electronic content delivery controller might instead poll the behavioral analyzer 36 for behavioral profile indications or access the behavioral profiles in the database 46. Other options for distribution of behavioral profiles or profile information may be or become apparent to those skilled in the art.

The electronic content delivery controller 56 is responsible for managing the delivery of targeted electronic content, which could be the most relevant advertisements, to a subscriber. The delivery process is "indirect" in the system 20, in that targeted electronic content stored in the database 52 by the targeted electronic content source(s) 60 is provided to the electronic content source 58 for delivery to the subscriber 22 with other electronic content that is being sent to the subscriber. Direct delivery mechanisms, in which targeted electronic content is sent directly from the electronic content delivery controller 56 to a subscriber, are also contemplated.

The electronic content delivery controller 56 selects targeted electronic content, for delivery to the subscriber through the access communication network 24 based on a visiting subscriber's identity and current behaviors, as reflected in the subscriber behavioral profile. A visiting subscriber ID, such as its source IP address and/or other identifier(s), could be sent by the electronic content source 58 to the electronic content delivery controller 56. The visiting subscriber's behaviors are then obtained by the electronic content delivery controller 56 from the behavioral analyzer 36 or the database 46, illustratively in the form of subscriber behavioral tracking tags. Subscriber behavior is compared against targeted electronic content stored in the database 52. The database 52 might contain advertisement creative for instance, i.e., an advertisement itself. Advertisements might include one or more of text, image, and video. For click-through based advertisements or other targeted content, an associated click-through URL may also be stored in the database 52.

A set of one or more pieces of relevant targeted electronic content is retrieved from the database 52 and forwarded to the electronic content source 58 for delivery to the subscriber 22. In the example of an Internet-based portal, the targeted content is pushed, along with the contents of the portal, to the subscriber's browser for display.

According to a direct delivery mechanism, targeted electronic content is sent to a subscriber for presentation with other electronic content, but need not necessarily be delivery along with the other content. A subscriber might access a web page, for example, that includes content from a particular portal, and advertisement slots within the web page could then be filled by sending advertisements directly to the subscriber's browser, without interacting with the portal.

In the event of a failure to identify behaviorally-matched targeted electronic content in the database 52, the electronic content delivery controller 56 may provide contextually related content to the electronic content source 58 for delivery to the subscriber 22, based on an output from the contextual analyzer 50.

It is possible that an electronic content source might choose to intentionally allocate some space for behaviorally targeted content, and other space for contextual content. Moreover, the electronic content delivery controller 56 could control and deliver a diverse set of advertisements and/or other targeted electronic content based on different synthesized traits of behavior associated with a particular subscriber. According to another scheme, the electronic content delivery controller 56 might be configured to also or instead provide non-behaviorally targeted electronic content to the electronic content source 58 so as to minimize the consumer "turn-off" factor that is sometimes associated with targeted advertising for instance.

In the case of a click-through based delivery model, any targeted content click on an electronic content provider webpage is reported to the electronic content delivery controller 56, directly or by the electronic content source 58, and registered by the electronic content delivery controller. In addition, a record of the click is sent by the electronic content delivery controller 56 to the billing management system 62 for tracking.

The electronic content delivery controller 56 may also be responsible for providing a click-fraud analysis function in some embodiments. Suspicious clicks or click patterns may be filtered out to ensure proper accountability to the targeted electronic content source(s) 60, for instance.

For impression based targeted content, billing is generally dependent only upon content delivery. The electronic content delivery controller 56 might thus provide a delivery indication to the billing management system 62 when impression based targeted content is delivered to a subscriber.

Several other components may cooperate with the electronic content delivery controller 56 in the targeted electronic content selection process. The contextual analyzer 50, for example, examines and analyzes the electronic content of the source 58, illustratively the content of a webpage accessed by the subscriber 22. The analysis results are sent to the electronic content delivery controller 56, via context tags for instance. The context analysis function is associated with some or all of the online characterization definitions 48 in the system 20. These definitions may thus be used not only for subscriber behavioral information collection and/or behavior profiling, but also for context analysis.

The targeted content campaign manager 54 provides an interface to the targeted electronic content source(s) 60 for controlling an overall distribution campaign. A campaign can be either click-through based or impression based. The targeted content campaign manager contains the mechanism to allow the targeted electronic content source(s) 60 to associate certain targeted content with one or more particular behavior definitions. It may also allow each targeted electronic content source 60 to control a bid associated with a campaign. Such an association can be at an individual advertisement level or at a group level for a set of multiple pieces of targeted content such as advertisements. A bid for a targeted content slot may be based on a cost-per-thousand-impression (CPM) model or on a cost-per-click (CPC) model that uses a ranking mechanism intended to maximize click-through rate, for example. It should be noted that bidding for targeted content spots, or more generally for the opportunity to provide targeted electronic content to a subscriber, is an optional feature that might not be provided in all embodiments.

The billing management system 62 provides monitoring, tracking, and delivery of billing information to the targeted electronic content source(s) 60 and to the electronic content source 58. Based on click-through and/or impression delivery, as reported to the billing management system 62 by the electronic content source 58 and/or the electronic content delivery controller 56, billing records associated with a particular campaign are updated. Periodically, invoices associated with a campaign can be issued to the targeted electronic content source(s) 60 for payment. In turn, an appropriate level of payment for revenue sharing can be issued to the electronic content source 58 periodically.

Having described the components of FIG. 2 and their respective functions, operation of the system 20 can now be considered in further detail by way of an illustrative example, referred to below as "TADA" (Targeted Ad Delivery Architecture). TADA can be implemented and operated natively by an ISP or by a third party entity.

Advertisers choosing to utilize the TADA mechanism would participate by first designing and controlling a campaign to distribute targeted electronic content, illustratively an advertising campaign. In the system 20, the targeted content campaign manager 54 provides campaign management functions, although in other embodiments these functions might be integrated with an advertiser system or some other component. Each campaign might have multiple associated advertisements.

The advertisements can be in any of multiple formats. Each advertisement, as determined by the advertiser, can be associated with one or more sets of behaviors. Behaviors may be selectable by an advertiser, having been previously designed and determined by the TADA operator, for example. Behavior definition design should provide maximal flexibility for participating advertisers, to allow them the best possible behavioral targeting and maximum return on investment and sales conversion results. This behavior definition design can be optimized and refined over time, with advertisers possibly having the opportunity to update behavior selections as definitions are expanded or otherwise revised. A data structure that could be used to map advertisements or other targeted electronic content to one or more behaviors is described below with reference to FIG. 5.

Advertisement-to-behavior-definition associations are configured during the campaign management process. The physical creative for each advertisement is then deposited into the database 52 for storage, and subsequent selection for delivery to the subscriber 22.

Electronic content sources such as online publishers that choose to utilize the TADA for feeding advertisements through their webpage and/or other content such as video streams allocate space within their website property or content. In the case of a video stream, video timeslots may be allocated for advertisement insertion. The advertisement spots might contain software (i.e., code) which directs a web browser to obtain advertisements from the electronic content delivery controller 56 of the TADA. When a particular subscriber visits the electronic content source 58 website, the visitor's identifier such as its source IP address is sent to the electronic content delivery controller 56. The electronic content delivery controller 56 then looks up the associated behaviors from the behavioral analyzer 36 or the database 46 for that particular visiting subscriber, and determines the exhibited subscriber behavior traits for which advertisers are interested in delivering an advertisement. This determination is made by examining the behaviors the advertisers have declared to be of interest as part of their advertising campaign definitions. Where each advertisement is declared by its advertiser to be CPM- or CPC-based and advertisement spots are similarly declared by electronic content sources, the electronic content delivery controller 56 matches each advertisement type to a corresponding type of advertisement spot.

In conjunction with selection criteria, such as the level of a bid in some embodiments, and possibly the history of click-through in the case of CPC advertisement, a "winning" advertiser and/or advertisement is declared by the electronic content delivery controller 56, and an advertisement is delivered to the subscriber, directly or through the electronic content source 58. If there is no behavioral match, then a contextual based advertisement might be selected.

Subsequent to the advertisement delivery and for the case of CPC advertisements, a click-through initiated from the subscriber's browser is reported to the electronic content delivery controller 56 by the electronic content source 58.

The act of delivering an advertisement or a click-through registration is then sent to the billing management system 62 for billing purposes. Periodically, the billing management system 62 may send out invoices to advertisers as well as payment to TADA content providers. Billing management could be a fully automated, semi-automated, or fully manual process.

From the subscriber perspective, there is no change in typical online usage experience. TADA does not require special hardware or software in any subscriber systems. Since the subscriber's online traffic traverses the access network 24, the traffic is being monitored by the behavioral information collector 28, 32, 34.

The behavioral information collector 28, 32, 34 may look for one or more of contexts of web destinations, online traffic patterns, search interests, and other online traffic signatures. Collected behavioral information is sent to the behavioral analyzer 36, illustratively on every online transaction, which could be a single transaction like a simple URL for a webpage or a group of transactions like a search-then-click-through sequence. The behavioral analyzer 36 then correlates the collected behavioral information and associates it with a subscriber. The behavioral information is also processed by a behavioral synthesizing function within the behavioral analyzer 36 to formulate a view of the subscriber's behaviors.

The synthesizing function may be exercised continuously as more and more behavioral information is collected. The subscriber behavior view is therefore refreshed and updated all the time. As the subscriber visits a TADA-based electronic content source or streams TADA-based video, for example, the electronic content delivery controller 56 may query the behavioral analyzer 36 or otherwise obtain the visiting subscriber's current behavior view. As described above, this view is then used to select advertisers and advertisements that are interested in targeting this type of subscriber behavior, thus completing the overall TADA operation.

Although described above primarily in the context of the system 20, embodiments of the invention may be implemented in methods and/or data structures. Such embodiments are described below with reference to FIGS. 3 to 5.

Figure 3:
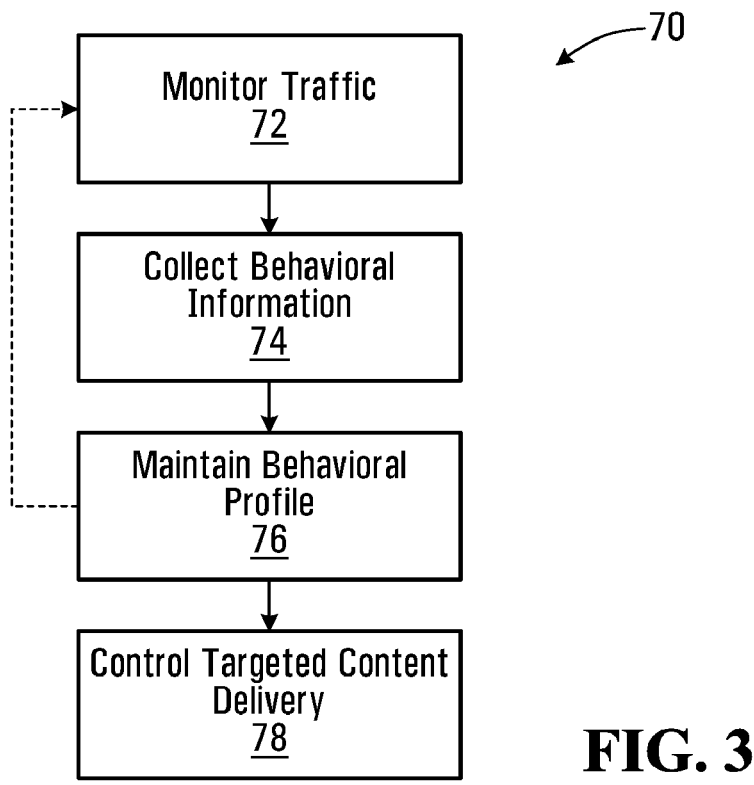
FIG. 3 is a flow diagram of an electronic content delivery control method.

FIG. 3 is a flow diagram of an electronic content delivery control method. The method 70 includes monitoring, at 72, all communication traffic exchanged with a communication network subscriber over an access communication link. The access communication link enables the subscriber to access electronic content. At 74, behavioral information indicative of behavior of the subscriber in using the access communication link is collected from the monitored communication traffic. A behavioral profile of the subscriber is maintained at 76 based on the behavioral information. Based on the behavioral profile, delivery of targeted electronic content to the subscriber, for presentation with electronic content that is accessed by the subscriber, is controlled at 78.

The method 70 represents one illustrative embodiment of the invention. Other embodiments may involve fewer, further, or additional operations and/or performing operations in a different order than shown. For example, traffic monitoring, behavioral information collection, and profile maintenance may be ongoing operations, as indicated by the dashed arrow returning from 76 to 72. Targeted content delivery at 78 may be subsequently initiated when a subscriber visits an electronic content source or otherwise accesses electronic content.

Other variations of the method 70 may be or become apparent to those skilled in the art, based on the foregoing description of the system 20, for example.

Figure 4:
FIGS. 4 and 5 are block diagrams of data structures.

FIG. 4 is a block diagram of a data structure that may be used to store behavioral profiles on a machine-readable medium, in the database 46 (FIG. 2) for instance.

The data structure 80 includes a subscriber identifier field 82, a subscriber behavioral profile field 84, and a field 86 for storing other subscriber and/or behavior information.

The subscriber identifier field 82 stores information, illustratively an IP address, which identifies a communication network subscriber. The profile field 84 stores a behavioral profile that is maintained for the identified subscriber based on behavioral information, which is collected from all communication traffic exchanged with the subscriber over an access communication link that enables the subscriber to access electronic content and is indicative of behavior of the subscriber in usage of the access communication link. The behavioral profile stored at 84 allows targeted electronic content to be selected for delivery to the subscriber with electronic content accessed by the subscriber.

Figure 5:
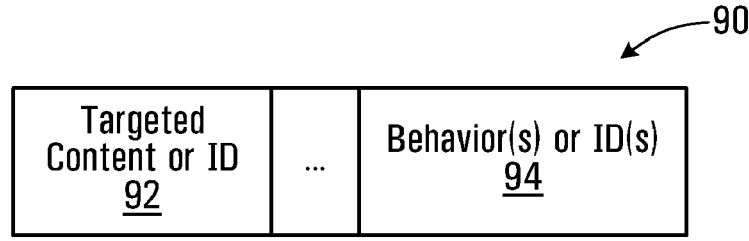

FIG. 5 is a block diagram of a data structure that could be used in some embodiments to map targeted electronic content to particular behaviors. Such a data structure might be stored in the data database 52 (FIG. 2), for example.

The data structure 90 includes a targeted content field 92 and a behavior field 94, and may also include other content- or behavior-related information. The targeted content field 92 includes information that specifies targeted electronic content. This information may include the actual content, or possibly an identifier of the content, illustratively a pointer to a memory location at which the content is stored. The behavior field 94 includes information that specifies one or more behaviors of interest for the targeted content. Behaviors might be specified using names and/or other identifiers that are also used in behavioral profiles, so as to allow targeted content to be selected for delivery to a subscriber who exhibits a behavior of interest. Mappings between targeted content and multiple behaviors may be specified in a single data structure 90, as shown, or in respective separate data structures for each behavior.

Data structures according to other embodiments of the invention may include further or fewer data fields than shown in FIGS. 4 and 5, in a similar or different order. Other types of data structures may also be provided to store, for example, subscriber information and/or definitions.

Embodiments of the invention may allow advertisers to deliver highly targeted advertisements to end consumers through online publishers' webpages or timeslots within video streams. A subscriber behavior inspection element may be deployed within an access network to continuously monitor and inspect all subscriber traffic, to thereby collect information that provides the basis for synthesizing behavior profiles of Internet subscribers, for example. As a subscriber visits an online publisher or streams an ad-supported video, tightly matched advertisements can be delivered in accordance with the exhibited behaviors, such as the ongoing buying intent and/or personal interests of the subscriber. If a behavioral match is not made, a context-based advertisement could be delivered as a default.

Advertisements can be of any format, including one or more of text, image, and video. An electronic content source through which targeted electronic content, in some embodiments advertisements, can be a traditional portal in which space has been allocated for advertisements, a video content provider that has allocated video advertisement spots before, during, or after a video stream, or some other type of provider of electronic content. The electronic content delivery control model can also be easily adopted for video download. As described above, advertisement delivery can be click-through based or simply impression based.

One possible advantage that may be provided by embodiments of the invention is better click-through and sales conversion. By gaining knowledge of a subscriber's buying intent and their personal interests, advertisers can more precisely apply their advertising dollars towards consumers that might be most likely to purchase their products. Context-based targeting does not inherently track ongoing consumer behaviors, and many advertisement selections are based on "inference" of context, such as search phrase or contents.

Traditional behavioral ad networks that rely on cookies being accepted and deposited in a subscriber's computer are vulnerable to subscribers' disabling of cookies, thus removing the ad network's ability to track subscriber behavior. The techniques disclosed herein do not depend on any special hardware, firmware, or software arrangements, including cookies, on the subscriber's computer.

As well, the ability of a conventional behavioral ad network to synthesize a subscriber's behavior is highly dependent on the scale of its "network" of portals. An ad network might be able to profile only a small percentage of a subscriber's online traffic. This restriction can severely inhibit the development of a precise behavioral understanding of the subscriber. In contrast, the techniques disclosed herein may utilize network elements that monitor all of a subscriber's traffic flow. As such, a precise behavioral profile can be obtained for the purpose of matching targeted electronic content to the interests of a subscriber.

Some traditional behavioral ad networks can also profile a subscriber based only on a certain traffic type, i.e., HyperText Transfer Protocol (HTTP) web traffic. In contrast, embodiments of the invention may be configured to profile all of the online traffic of a subscriber, including, for example, URL, HTML, Really Simple Syndication (RSS) feeds, search phrase and sequence, click-through patterns, online application signature, etc.

In order to increase the base of subscribers to which targeted electronic content delivery can be controlled, multiple access network operators such as ISPs could cooperate as an aggregated consortium. Such a consortium would represent a significantly larger subscriber base and thus a much wider reach, and could also provide for advertisers a single point of purchase of advertising space over multiple subscriber bases.

Traditional telecom equipment providers are constantly looking for ways to improve service providers' values in delivery of Internet services, for example. Embodiments of the invention may allow ISPs to actively derive revenues from the online advertisement market by providing behaviorally targeted advertisement delivery services for advertisers.

What has been described is merely illustrative of the application of principles of embodiments of the invention. Other arrangements and methods can be implemented by those skilled in the art without departing from the scope of the present invention.

For example, although described primarily in the context of methods and systems, other implementations of the invention are also contemplated, as instructions stored on a machine-readable medium.

We claim:

1. A system comprising:
a behavioral information collector operable to monitor communication traffic exchanged with a communication network subscriber over an access communication link, the access communication link enabling the subscriber to access electronic content, the behavioral information collector being configurable to collect from any of a plurality of types of communication traffic in the monitored communication traffic behavioral information indicative of behavior of the subscriber in using the access communication link;
a behavioral analyzer operatively coupled to the behavioral information collector and operable to maintain a behavioral profile of the subscriber that reflects ongoing behavior of the subscriber, based on behavioral information collected from only one or more particular types of the plurality of types of communication traffic in the monitored communication traffic, maintenance of the behavioral profile being unaffected by behavioral information collected from types of communication traffic other than the one or more particular types of communication traffic; and
an electronic content delivery controller operatively coupled to the behavioral analyzer and operable to control, based on the behavioral profile, delivery of targeted electronic content to the subscriber for presentation with electronic content accessed by the subscriber,
wherein at least one of the behavioral information collector, the behavioral analyzer, and the electronic content delivery controller is implemented using hardware,
wherein the access communication link comprises a network link in an access network, the access network comprising an electronic content source that is operable to deliver the accessed electronic content to the subscriber,
wherein the electronic content source provides an Internet Protocol Television (IPTV) service, and
wherein the electronic content delivery controller is further operable to select the targeted electronic content from targeted electronic content provided by multiple targeted electronic content providers.

2. The system of claim 1, wherein the behavioral information collector is configured to collect the behavioral information from only the one or more particular types of communication traffic in the monitored communication traffic.

3. The system of claim 1, wherein the monitored communication traffic comprises packet traffic, the system further comprising:
a Deep Packet Inspection (DPI) module operatively coupled to the behavioral information collector and operable to monitor the access communication traffic.

4. The system of claim 1, wherein the behavioral information collector is in an offline position relative to the access communication link.

5. The system of claim 1, wherein the targeted electronic content comprises an advertisement.

6. The system of claim 1, wherein at least one of the behavioral information collector, the behavioral analyzer, and the electronic content delivery controller is implemented in software for execution by one or more processing elements.

7. The system of claim 1, implemented in a set of one or more network elements for providing to a subscriber system access to electronic content through the access network.

8. The system of claim 1, wherein the one or more particular types of communication traffic are indicated in an online characterization definition.

9. A system comprising:

a behavioral information collector operable to monitor communication traffic exchanged with a communication network subscriber over an access communication link, the access communication link enabling the subscriber to access electronic content, and to collect from the monitored communication traffic behavioral information indicative of behavior of the subscriber in using the access communication link;

a behavioral analyzer operatively coupled to the collector and operable to maintain a behavioral profile of the subscriber based on the behavioral information;

an electronic content delivery controller operatively coupled to the behavioral analyzer and operable to control, based on the behavioral profile, delivery of targeted electronic content to the subscriber for presentation with electronic content accessed by the subscriber; and a memory operatively coupled to the behavioral analyzer for storing behavioral analysis definitions, wherein the behavioral analyzer maintains the subscriber behavioral profile by creating or updating the subscriber behavioral profile in accordance with the stored behavioral analysis definitions, the behavioral analysis definitions indicating types of communication traffic or behavioral information to be used in maintaining the behavioral profile, and the manner in which the behavioral information is analyzed to maintain the behavioral profile, wherein the access communication link comprises a network link in an access network, the access network comprising an electronic content source that is operable to deliver the accessed electronic content to the subscriber, wherein the electronic content source provides an Internet Protocol Television (IPTV) service, and wherein the electronic content delivery controller is further operable to select the targeted electronic content from targeted electronic content provided by multiple targeted electronic content providers.

10. A system comprising:

a behavioral information collector operable to monitor communication traffic exchanged with a communication network subscriber over an access communication link, the access communication link enabling the subscriber to access electronic content, and to collect from the monitored communication traffic behavioral information indicative of behavior of the subscriber in using the access communication link;

a behavioral analyzer operatively coupled to the collector and operable to maintain a behavioral profile of the subscriber based on the behavioral information;

an electronic content source operable to deliver to the subscriber electronic content that is accessed by the subscriber;

a source of targeted electronic content, the targeted electronic content comprising electronic content for delivery to subscribers exhibiting one or more behaviors of interest, an electronic content delivery controller operatively coupled to the behavioral analyzer, to the electronic content source, and to the source of targeted electronic content and operable to control, based on the behavioral profile and the one or more behaviors of interest, delivery of targeted electronic content from the source of targeted electronic content to the subscriber for presentation with the accessed electronic content by providing the targeted electronic content to the electronic content source for delivery to the subscriber with the accessed electronic content, wherein at least one of the behavioral information collector, the behavioral analyzer, the electronic content delivery controller, and the electronic content source is implemented using hardware, wherein the access communication link comprises a network link in an access network, the access network comprising the electronic content source that is operable to deliver the accessed electronic content to the subscriber, wherein the electronic content source provides an Internet Protocol Television (IPTV) service, and wherein the electronic content delivery controller is further operable to select the targeted electronic content from targeted electronic content provided by multiple targeted electronic content providers.

11. A method comprising:

monitoring, by a behavioral information collector, communication traffic exchanged with a communication network subscriber over an access communication link, the access communication link enabling the subscriber to access electronic content;

collecting, by the behavioral information collector, from the monitored communication traffic behavioral information indicative of behavior of the subscriber in using the access communication link, the behavioral information collector being configurable to collect the behavioral information from any of a plurality of types of communication traffic in the monitored communication traffic;

maintaining, by a behavioral analyzer, a behavioral profile of the subscriber that reflects ongoing behavior of the subscriber, based on behavioral information collected from only one or more particular types of the plurality of types of communication traffic in the monitored communication traffic, the maintaining of the behavioral profile being unaffected by behavioral information collected from types of communication traffic other than the one or more particular types of communication traffic; and controlling, by an electronic content delivery controller, based on the behavioral profile, delivery of targeted electronic content to the subscriber for presentation with electronic content accessed by the subscriber, wherein at least one of the behavioral information collector, the behavioral analyzer, and the electronic content delivery controller is implemented using hardware, wherein the access communication link comprises a network link in an access network, the access network comprising an electronic content source that is operable to deliver the accessed electronic content to the subscriber and provides an Internet Protocol Television (IPTV) service, and wherein the method further comprises:

selecting, by the electronic content delivery controller, the targeted electronic content from targeted electronic content provided by multiple targeted electronic content providers.

12. The method of claim 11 wherein collecting comprises collecting the behavioral information from only the one or more particular types of communication traffic in the monitored communication traffic.

13. The method of claim 11, wherein the targeted electronic content comprises an advertisement.

14. A non-transitory machine-readable medium storing instructions which when executed perform a method comprising:

monitoring communication traffic exchanged with a communication network subscriber over an access communication link, the access communication link enabling the subscriber to access electronic content;

collecting from the monitored communication traffic behavioral information indicative of behavior of the subscriber in using the access communication link, the collecting comprising collecting the behavioral information from any of a plurality of types of communication traffic in the monitored communication traffic;

maintaining a behavioral profile of the subscriber that reflects ongoing behavior of the subscriber, based on behavioral information collected from only one or more particular types of the plurality of types of communication traffic in the monitored communication traffic, the maintaining of the behavioral profile being unaffected by behavioral information collected from types of communication traffic other than the one or more particular types of communication traffic; and controlling based on the behavioral profile, delivery of targeted electronic content to the subscriber for presentation with electronic content accessed by the subscriber, wherein the access communication link comprises a network link in an access network, the access network comprising an electronic content source that is operable to deliver the accessed electronic content to the subscriber and provides an Internet Protocol Television (IPTV) service, and wherein the method further comprises:

selecting the targeted electronic content from targeted electronic content provided by multiple targeted electronic content providers.

\* \* \* \* \*